(12) United States Patent
Hsu et al.

(10) Patent No.: US 10,498,147 B2
(45) Date of Patent: Dec. 3, 2019

(54) CHARGING CONTROL SYSTEM AND POWER CHARGING MANAGEMENT METHOD THEREOF

(71) Applicant: Aver Information Inc., New Taipei (TW)

(72) Inventors: Chi-Fa Hsu, New Taipei (TW);
Chao-Hung Chang, New Taipei (TW);
Lien-Kai Chou, New Taipei (TW);
Cheng-Cheng Yu, New Taipei (TW);
Jy-Shyan Lin, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 31 days.

(21) Appl. No.: 15/994,015

(22) Filed: May 31, 2018

(65) Prior Publication Data
US 2019/0131801 A1 May 2, 2019

(30) Foreign Application Priority Data

Oct. 24, 2017 (TW) .............................. 106136448 A

(51) Int. Cl.
*H02J 7/00* (2006.01)
(52) U.S. Cl.
CPC .......... *H02J 7/0022* (2013.01); *H02J 7/0024* (2013.01); *H02J 7/0026* (2013.01); *H02J 7/0083* (2013.01)
(58) Field of Classification Search
CPC .................................................. H02J 7/0022
USPC ........................................................ 320/134
See application file for complete search history.

(56) References Cited

U.S. PATENT DOCUMENTS

| | | | | |
|---|---|---|---|---|
| 6,211,681 B1 * | 4/2001 | Kagawa | ................... | B60K 6/46 |
| | | | | 324/426 |
| 8,008,804 B2 * | 8/2011 | Capp | ......................... | H02J 3/30 |
| | | | | 307/44 |
| 2006/0171182 A1 * | 8/2006 | Siri | .................... | H02M 3/33592 |
| | | | | 363/131 |
| 2008/0084179 A1 * | 4/2008 | Emori | .................... | H02J 7/0016 |
| | | | | 320/109 |
| 2013/0002199 A1 * | 1/2013 | Hu | ......................... | H02J 7/0004 |
| | | | | 320/112 |
| 2016/0211676 A1 * | 7/2016 | Chiang | ..................... | H02J 3/14 |

FOREIGN PATENT DOCUMENTS

| | | |
|---|---|---|
| CN | 103532198 B | 1/2017 |
| CN | 105098895 B | 8/2017 |
| TW | I463763 | 12/2014 |
| TW | I483620 | 5/2015 |
| TW | I568128 | 1/2017 |

\* cited by examiner

*Primary Examiner* — Yalkew Fantu
(74) *Attorney, Agent, or Firm* — McClure, Qualey & Rodack, LLP

(57) ABSTRACT

A power charging management method is cooperated with a charging control system. The charging control system includes a control unit and a plurality of charging zones. The control unit controls the charging zones to turn on or turn off so as to selectively allow a charging power to be provided to the charging zones. The power charging management method includes a system scan procedure, a whole zone charging procedure, a protecting procedure and a subzone charging procedure.

15 Claims, 6 Drawing Sheets

CHARGING CONTROL SYSTEM AND POWER CHARGING MANAGEMENT METHOD THEREOF

CROSS REFERENCE TO RELATED APPLICATIONS

This Non-provisional application claims priority under 35 U.S.C. § 119(a) on patent application Ser. No. 10/6136448 filed in Taiwan on Oct. 24, 2017, the entire contents of which are hereby incorporated by reference.

BACKGROUND

1. Technical Field

The present invention relates to a control system, in particular, to a charging control system and a power charging management method thereof.

2. Description of Related Art

As technology grows rapidly in recent years and concerning environmental protection, digital devices such as tablets or laptops are introduced for the academic institutions to perform education, so that a purpose of paperless-ness may be achieved.

In order to simultaneously adopt and charge several to tens of digital devices, a charging control system is also introduced for the academic institutions to achieve the above goals. The charging control system is usually designed to be capable of adopting tens of digital devices. Furthermore, tens of power sockets corresponding to the tens of digital devices are disposed in the charging control system, so as to charge the tens of digital devices.

However, according to various amounts of remained power level of the digital devices, various amounts of current values are required for the charging operation. For instance, a greater current value may be required for charging a digital device with a pretty low power level. As a result, in case that the charging control system is required to simultaneously charge tens of digital devices, the required current value may exceed a upper limited level of a power distribution system that is coupled to the charging control system, and thus causes tripping of the circuit breaker.

To avoid the aforesaid tripping condition, tens of power sockets are usually divided into a plurality of charging groups. In this manner, when all power sockets within a single charging group are charged, the current value thereof will be smaller than an upper limited current value of the power distribution system. To achieve the above, each charging group requires an electrically-controlled switch to control whether to provide power. However, the electrically-controlled switch will be frequently switched and lifetime thereof will thus be decreased.

It is therefore required to provide a charging control system and a power charging management method, which are capable of directly managing charging power as a whole and arranging the concerned digital devices on demand. Thereby, quality of charging and safety as a whole may be enhanced.

SUMMARY OF THE INVENTION

The purpose of the present invention is to provide a charging control system and a power charging management method thereof, which can enhance quality of charging and safety as a whole by managing and distributing charging power.

To achieve the above purpose, the present invention provides a power charging management method for a charging control system. The charging control system includes a control unit and a plurality of charging zones. The control unit controls the charging zones to turn on or turn off so as to selectively allow a charging power to be provided to the charging zones. The power charging management method includes a system scan procedure, a whole zone charging procedure, a protecting procedure and a subzone charging procedure. According to an embodiment of the present invention, the subzone charging procedure includes a first subzone charging procedure and a second subzone charging procedure.

The system scan procedure includes the following steps: measuring a subzone current value for each of the charging zones sequentially and summing all of the measured subzone current values to obtain a system current value; and comparing the system current value with an upper limited current threshold value.

The whole zone charging procedure is executed if, in the system scan procedure, the system current value is determined as smaller than the upper limited current threshold value, comprising the following steps: turning on all of the charging zones so as to provide the charging power to all of the charging zones; measuring the system current value; comparing the system current value with the upper limited current threshold value; and measuring the system current value if the system current value is smaller than the upper limited current threshold value.

The first subzone charging procedure is executed if, in the system scan procedure, the system current value is determined as greater than the upper limited current threshold value, comprising the following steps: turning on one of the charging zones so as to provide the charging power to the turned-on charging zone; comparing a subzone charging time with a predetermined subzone charging time; determining whether a power level of the turned-on charging zone is full; determining whether all of the charging zones have ever been turned on if the subzone charging time is equal to the predetermined subzone charging time or if the power level of the turned-on charging zone is full; turning on another one of the charging zones if not all the charging zones have ever been turned on; and executing the system scan procedure if all the charging zones have ever been turned on.

According to an embodiment of the present invention, the power charging management method further comprises an initial measuring procedure, comprising: obtaining the system current value; executing the protecting procedure if the system current value is greater than the upper limited current threshold value; and executing the system scan procedure or the step of comparing the whole zone charging time with the predetermined whole zone charging time in the protecting procedure, if the system current value is smaller than the upper limited current threshold value.

According to an embodiment of the present invention, the power charging management method further comprises a protecting procedure which is executed if, in the whole zone charging procedure, the system current value is determined as greater than the upper limited current threshold value, the protecting procedure comprising the following steps: turning off all of the charging zones so as to prevent the charging power from being provided to all of the charging zones; and comparing a whole zone charging time with a predetermined whole zone charging time. In addition, the first subzone charging procedure is further executed if, in the protecting procedure, the whole zone charging time is determined as greater than the predetermined whole zone charging time.

According to an embodiment of the present invention, the power charging management method further comprises a second subzone charging procedure which is executed if, in the protecting procedure, the whole zone charging time is identified as smaller than the predetermined whole zone charging time, the second subzone charging procedure comprising the following steps: turning on one of the charging zones sequentially so as to provide the charging power to the turned-on charging zones; determining whether all of the charging zones have ever been turned on; and executing the system scan procedure if all of the charging zones have ever been turned on.

According to an embodiment of the present invention, the power charging management method wherein, in the system scan procedure, the step of measuring the subzone current value for each of the charging zones sequentially and summing all of the measured subzone current values to obtain the system current value, further comprising the following steps: turning on one of the charging zones and providing the charging power to the turned-on charging zone; comparing a scan charging time with a predetermined scan charging time; recording a measured subzone current value of the turned-on charging zone, if the scan charging time is equal to the predetermined scan charging time; and determining whether all of the charging zones have ever been turned on.

According to an embodiment of the present invention, the whole zone charging procedure further comprises counting the whole zone charging time. The first subzone charging procedure further comprises counting a lower limited current charging time.

According to an embodiment of the present invention, in the first subzone charging procedure, the step of determining whether a power level of the turned-on charging zone is full comprises: comparing the system current value with a lower limited current threshold value; comparing the lower limited current charging time with a predetermined lower limited current charging time; and determining the power level of the turned-on charging zone as full if the system current value is smaller than a lower limited current threshold value, and if the lower limited current charging time is equal to the predetermined lower limited current charging time.

According to an embodiment of the present invention, the second subzone charging procedure further comprises comparing the subzone charging time with the predetermined subzone charging time. The step of determining whether all the charging zone have ever been turned on is executed if the subzone charging time is equal to the predetermined subzone charging time.

In addition, to achieve the above purpose, the present invention provides a charging control system which comprises a power converting unit, a control unit, a plurality of driving units, a plurality of electrically-controlled switch units and a current sensing unit.

The power converting unit includes an input terminal and an output terminal, to receive a charging power through the input terminal and output a direct-current power through the output terminal.

The control unit is electrically coupled to the output terminal of the power converting unit, to receive the direct-current power and output a switch control signal.

The driving units each of which is electrically coupled to the control unit respectively, to receive the switch control signal.

The electrically-controlled switch units each of which is electrically coupled to a corresponding one of the driving units, wherein the corresponding one of the driving units controls operation of the respective one of the electrically-controlled switch units in response to the switch control signal.

The current sensing unit is electrically coupled between the electrically-controlled switch units and the charging power, to detect a system current value and transmit the system current value to the control unit.

In addition, if the system current value is smaller than a upper limited current threshold value, the control unit is configured to selectively execute one of a scan charging procedure, a subzone charging procedure and a whole zone charging procedure and output the switch control signal to control operation of the electrically-controlled switch units.

According to an embodiment of the present invention, the subzone charging procedure comprises a first subzone charging procedure and a second subzone charging procedure.

According to an embodiment of the present invention, each one of the electrically-controlled switch units is electrically coupled to at least one power output terminal, the electrically-controlled switch units and the power output terminals are divided into a plurality of charging zones.

As described in the above paragraphs, the charging control system and the power charging management method according to the present invention utilize the system scan procedure, the whole zone charging procedure, the first subzone charging procedure, the second subzone charging procedure and the protecting procedure during the charging process so as to suit various charging conditions. Furthermore, the electrically-controlled switch units can be prevented from being frequently turned on that may cause decreased lifetime for components. Moreover, when overloading of the charging control system occurs, charging power can be still provided to all electronic devices by means of subzone charging, so stat power distribution system and charging control system may be protected. In addition, efficiency and utilization for the charging control system may be enhanced, and an effective power charging management method may be thereby achieved.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
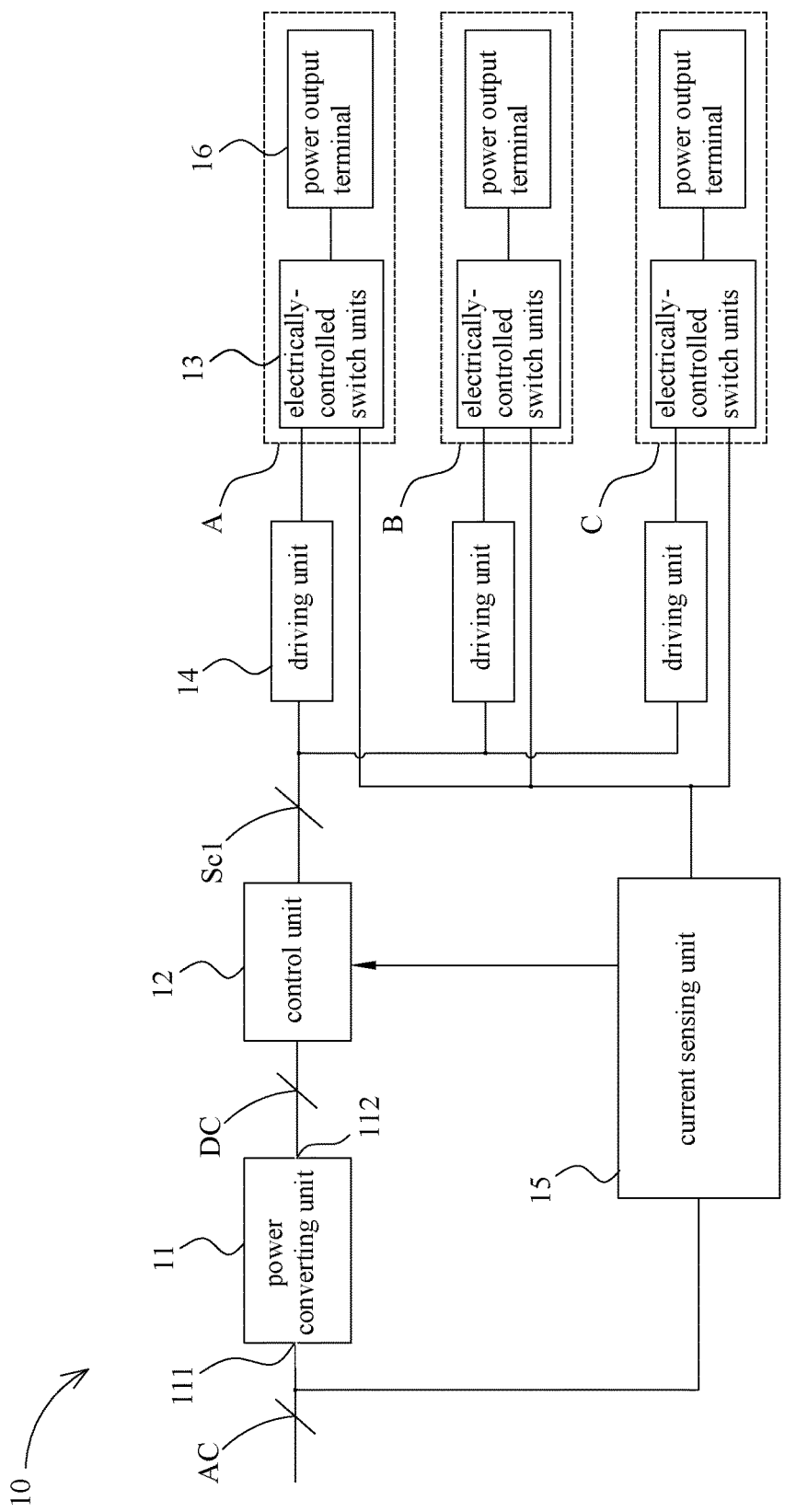
FIG. 1 is a block diagram illustrating the charging control system according to an embodiment of the present invention.

Referring FIG. 1, a charging control system 10 includes a power converting unit 11, a control unit 12, a plurality of electrically-controlled switch units 13, a plurality of driving units 14 and a current sensing unit 15. The charging control system 10 is used to electrically couple a plurality of electronic devices (not shown in FIG. 1) so as to charge each of the electronic devices. Wherein, the electronic devices may include but not limited to ones which can resume to operate after re-charging, such as digital cameras, mobile communication devices and laptops, etc.

The power converting unit 11 has an input terminal 111 and an output terminal 112, which inputs a charging power AC to the input terminal 111 and outputs a direct-current power DC through the output terminal 112. In this embodiment, the power converting unit 11 is an AC-DC Converter, and the charging power AC is thus an alternating-current power. Furthermore, in another embodiment, the power converting unit 11 may be a DC-DC Converter, and the charging power may thus be a direct-current power.

The control unit 12 is electrically coupled to the output terminal 112 of the power converting unit 11 so as to receive the direct-current power DC, and to output at least one switch control signal Sc1 to each of the driving units 14.

The electrically-controlled switch units 13 are electrically coupled to the corresponding driving units 14, respectively. The driving units 14 receive the switch control signal Sc1 and thereby control operation of the electrically-controlled switch units 13. In this embodiment, each of the electrically-controlled switch units 13 may be a relay, and the driving units 14 control the relays to turn on or turn of according to the switch control signal Sc1. Each of the electrically-controlled switch units 13 is electrically coupled to at least one power output terminal 16. Furthermore, the electrically-controlled switch units 13 and the power output terminals 16 are divided into a plurality of charging zones. In this embodiment, the electrically-controlled switch units 13 and the power output terminals 16 are divided into a first charging zone A, a second charging zone B and a third charging zone C.

In another embodiment, one single charging zone may be composed of a plurality of electrically-controlled switch units 13 and a plurality of power output terminals 16. The above configuration may be altered based on actual loading and power providing capability of the system.

The current sensing unit 15 is electrically coupled between the electrically-controlled switch units 13 and the charging power AC. Thereby, the current sensing unit 15 detects a system current value and transmits the system current value to the control unit 12. The aforesaid system current value is directed to the loading current when charging each of the electronic devices by means of electrically coupling each one to the corresponding power output terminal 16.

Figure 2:
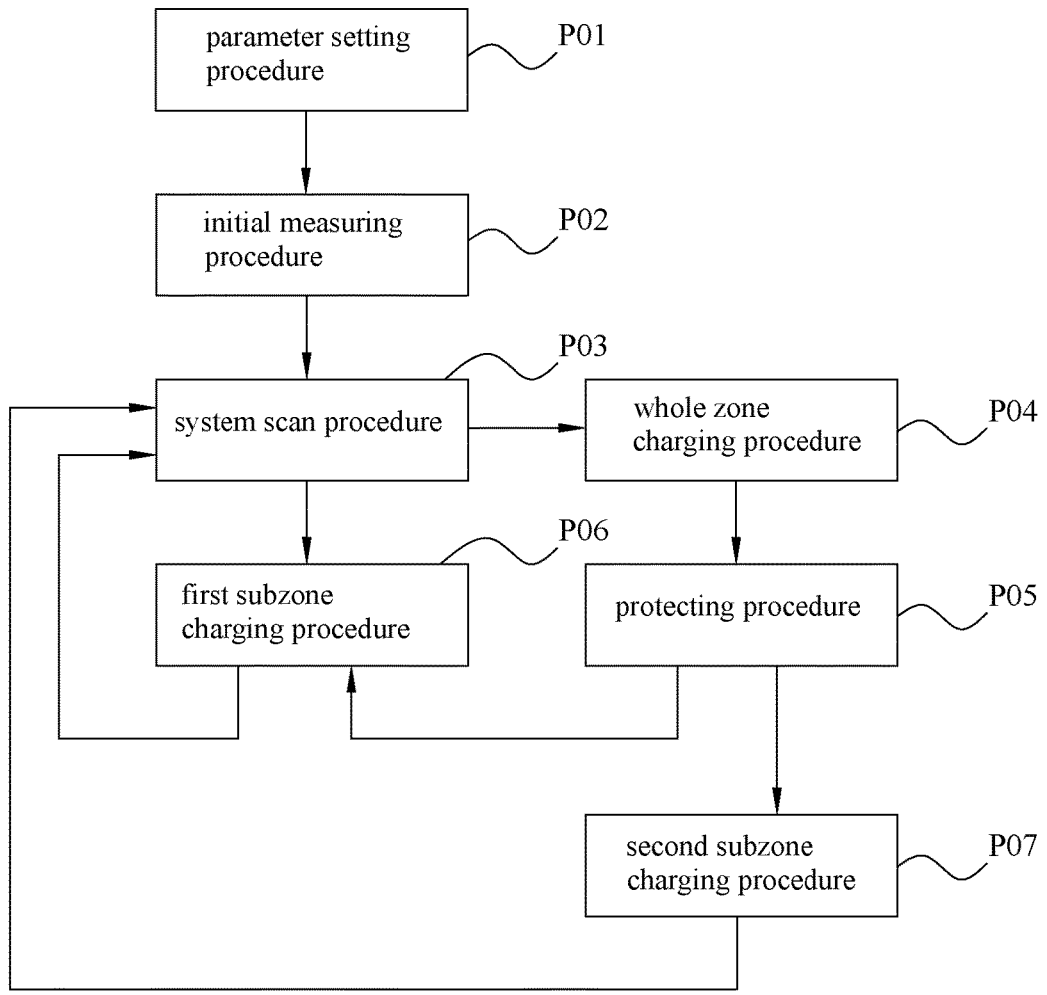
FIG. 2 is a flow chart showing the power charging management method according to an embodiment of the present invention.

Referring FIG. 2 which illustrates a power charging management method according to a preferred embodiment of the present invention. The power charging management method includes a parameter setting procedure P01, an initial measuring procedure P02, a system scan procedure P03, a whole zone charging procedure P04, a protecting procedure P05, a first subzone charging procedure P06 and a second subzone charging procedure P07.

Figure 3A:
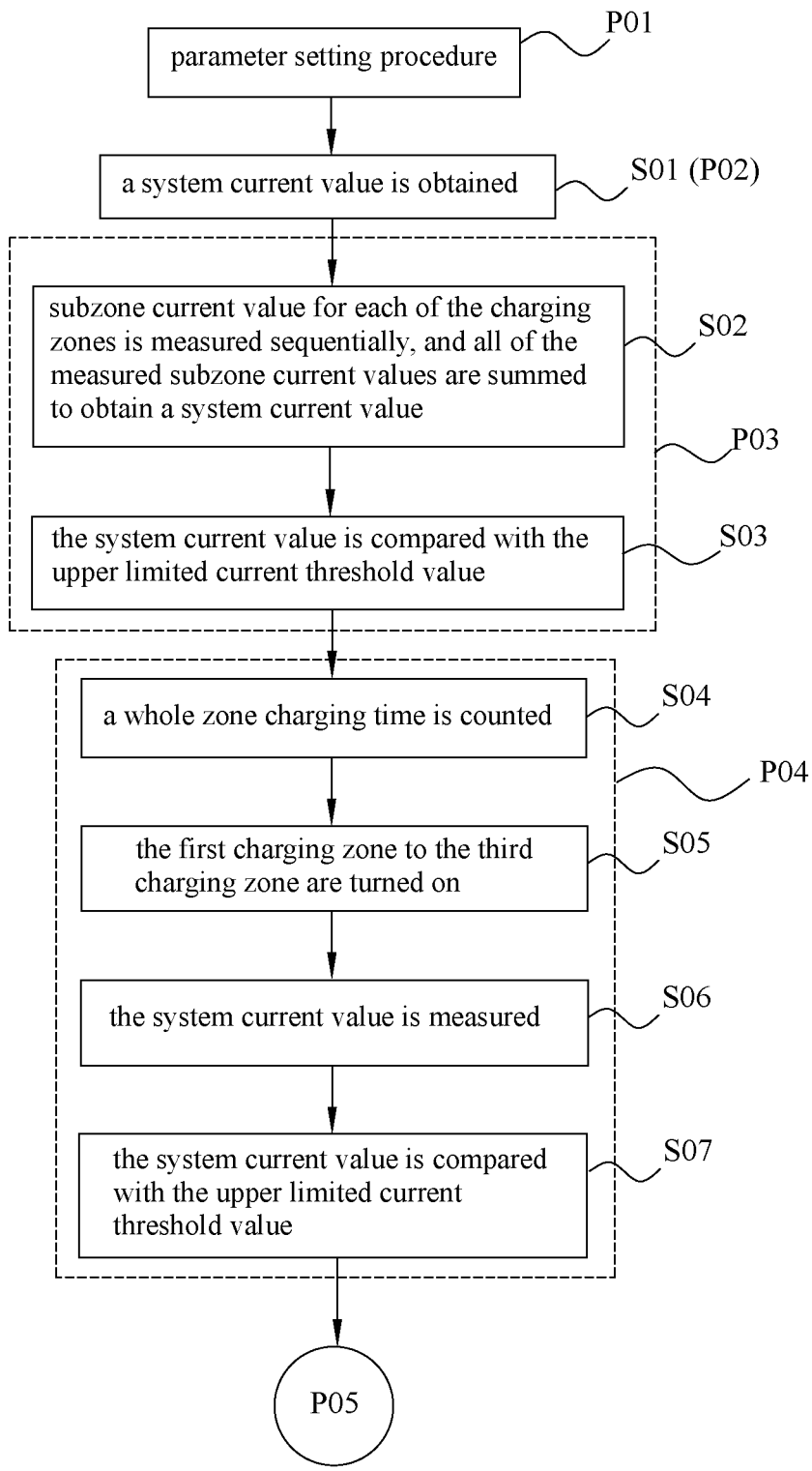
FIGS. 3A and 3B are other flow charts showing the power charging management method according to the embodiment of the present invention.
Figure 3B:
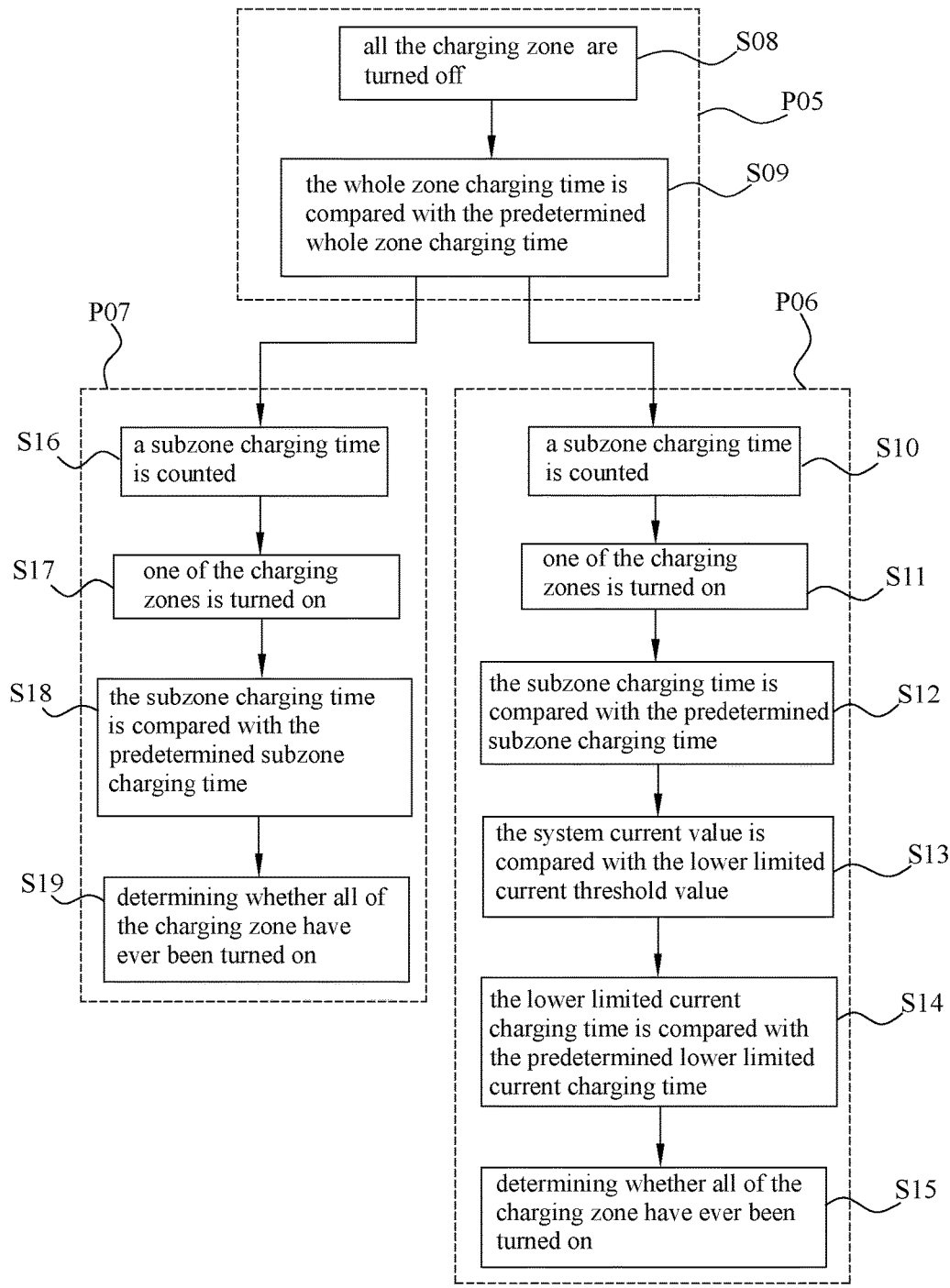

The power charging management method in a preferred embodiment of the present invention is further described by reference to the fore paragraph accompanying FIGS. 3A and 3B. In the parameter setting procedure P01, constants and variables which are used in the power charging management method are set. The constants and variables include at least a predetermined scan charging time, a predetermined subzone charging time, a predetermined whole zone charging time, a upper limited current threshold value and a lower limited current threshold value.

The initial measuring procedure P02 includes step S01. At step S01, a system current value is obtained. Herein, through the driving units 14, the control unit 12 outputs the switch control signal Sc1 to turn on all electrically-controlled switch units 13, so as to provide charging power AC to all charging zones. Furthermore, the current sensing unit 15 measures a charging current that occurs when providing charging power AC, and the measured charging current is directed to the aforesaid system current value. In addition, the protecting procedure P05 is executed when the system current value is greater than the upper limited current threshold value, and the system scan procedure P03 is executed when the system current value is smaller than the upper limited current threshold value.

The system scan procedure P03 includes step S02 and step S03. At step S02, a subzone current value for each of the charging zones is measured sequentially, and all of the measured subzone current values are summed to obtain a system current value. At step S03, the system current value is compared with the upper limited current threshold value. If the system current value is smaller than the upper limited current threshold value, the whole zone charging procedure P04 is executed. On the other hand, if the system current value is greater than the upper limited current threshold value, the first subzone charging procedure P06 is executed. Herein, the aforesaid subzone current value is the measured charging current given that only one of the first charging zone A to the third charging zone C is turned on.

The whole zone charging procedure P04 includes step S04 to step S07. At step S04, a whole zone charging time is counted. Herein, counting of the whole zone charging time is started while the whole zone charging procedure P04 is entered, and the counted whole zone charging time will be recorded. At step S05, the first charging zone A to the third charging zone C are turned on, so that charging power can be provided to the above turned on charging zones. Herein, the aforesaid charging zones A to C are turned on is directed to that, through the driving units 14, the control unit 12 outputs switch control signal Sc1 to turn on the corresponding electrically-controlled switch unit 13 and so as to provide charging power AC to the corresponding charging zone. At step S06, the system current value is measured. At step S07, the system current value is compared with the upper limited current threshold value. If the system current value is smaller than the upper limited current threshold value, step S06 is proceeded. On the other hand, if the system current value is greater than the upper limited current threshold value, the protecting procedure P05 is executed.

The protecting procedure P05 includes step S08 to step S09. At step S08, the first charging zone A to the third charging zone C are turned off, so as to prevent the charging power AC from being provided to the first charging zone A to the third charging zone C. Herein, the above measured results show that the system current value is greater than the upper limited current threshold value, which indicates overflow of system loading. Accordingly, through the driving units 14, the control unit 12 immediately outputs switch control signal Sc1 to turn off the corresponding electrically-controlled switch unit 13, and so as to prevent the charging power AC from being provided to the first charging zone A to the third charging zone C. At step S09, the whole zone charging time is compared with the predetermined whole zone charging time. If the whole zone charging time is smaller than the predetermined whole zone charging time, the second subzone charging procedure P07 is executed. On the other hand, if the whole zone charging time is greater than or equal to the predetermined whole zone charging time, the first subzone charging procedure P06 is executed.

In another embodiment, after step S08 has been executed, the initial measuring procedure may be re-called so as to further determine whether malfunction of the system occurs.

The first subzone charging procedure P06 includes step S10 to step S15. At step S10, a subzone charging time is counted. Herein, counting of the subzone charging time is started while the first subzone charging procedure P06 is entered, and the counted subzone charging time will be recorded. At step S11, one of the charging zones is turned on, so that the charging power AC can be provided to the turned on charging zone. At step S12, the subzone charging time is compared with the predetermined subzone charging time. At step S13, the system current value is compared with the lower limited current threshold value. At step S14, the lower limited current charging time is compared with the predetermined lower limited current charging time. Herein, if the system current value is smaller than the lower limited current threshold value and the lower limited current charging time is equal to the predetermined lower limited current charging time, power level of the charging zone will be determined as full. If the subzone charging time is equal to the predetermined subzone charging time or if power level of the charging zone is determined as full, step S15 is executed. At step S15, it is determined whether all of the first charging zone A to the third charging zone C have ever been turned on. If the determined result is negative, another one of the charging zones is turned on. On the other hand, if the determined result is confirmative, the system scan procedure P03 is executed.

The second subzone charging procedure P07 includes step S16 to step S19. At step S16, a subzone charging time is counted. Herein, counting of the subzone charging time is started while the second subzone charging procedure P07 is entered, and the counted subzone charging time will be recorded. At step S17, one of the charging zones is turned on, so that the charging power AC can be provided to the turned on charging zone. At step S18, the subzone charging time is compared with the predetermined subzone charging time. If the subzone charging time is equal to the predetermined subzone charging time, step S19 is executed. At step S19, it is determined whether all of the first charging zone A to the third charging zone C have ever been turned on. If the determined result is negative, another one of the charging zones is turned on. On the other hand, if the determined result is confirmative, the system scan procedure P03 is executed.

Referring FIG. 4 again, detailed description for the power charging management method of the charging control system of a preferred embodiment of the present invention will be given in the following paragraphs.

At step S21, parameters of the charging system are set as follows: the predetermined charge zones number is set as 3, the charge zones number variable is set as 1, the predetermined scan charging time is set as 10 sec, the predetermined subzone charging time is set as 20 minutes, the predetermined whole zone charging time is set as 20 minutes, the predetermined lower limited current charging time is set as 3 minutes, the upper limited current threshold value is set as 10A and the lower limited current threshold value is set as 1A.

In this embodiment, each charging zone is composed of an electrically-controlled switch unit and a power output terminal. In other words, the first charging zone is composed of a first electrically-controlled switch unit and a first power output terminal. Similarly, the second charging zone is composed of a second electrically-controlled switch unit and a second power output terminal. In addition, the third charging zone is composed of a third electrically-controlled switch unit and a third power output terminal.

At step S22, all charging zones are turned on. Furthermore, concerned current values associated with the turned on charging zones are measured so as to obtain the system current value. Moreover, the obtained system current value is compared with the upper limited current threshold value. If the system current value is greater than the upper limited current threshold value, all the electrically-controlled switch units are turned off, and an alarm signal is issued. Meanwhile, the concerned record is stored. On the other hand, if the system current value is smaller than the upper limited current threshold value, step S23 is executed.

At step S23, the scan charging time is counted down based on the predetermined scan charging time. Meanwhile, the corresponding electrically-controlled switch unit is turned on, so that charging power can be provided to the corresponding charging zone. As the scan charging time is counted down to zero, step S24 is executed.

At step S24, each subzone current is recorded. Furthermore, it is determined whether the subzone current corresponding to each charging zone has been recorded. If the determined result shows that, not all the subzone currents have been recorded, step S23 is executed again. The aforesaid steps S23 and S24 are repeated until subzone currents for all charging zones have been recorded. Next, the charging zone number variable is reset. Thereafter, step S25 is executed.

At step S25, each subzone current at step S23 are accumulated, and the accumulated result is compared with the upper limited current threshold value. If the accumulated subzone current is smaller than the upper limited current threshold value, step S26 is executed. On the other hand, if the accumulated subzone current is greater than the upper limited current threshold value, step S30 is executed.

At step S26, counting of the whole zone charging time is started. Meanwhile, all the electrically-controlled switch units are turned on, so that charging power can be provided to all the charge zones. Thereafter, step S27 is executed.

At step S27, system current value is measured, and the measured system current value is compared with the upper limited current threshold value. If the system current value is smaller than the upper limited current threshold value, step S27 is executed once again. In other words, as the system current value is smaller than the upper limited current threshold value, the charging control system continuously provides charging power to all charging zones. In this manner, the electrically-controlled switch units can be prevented from being switched frequently that may reduce lifetime thereof. If an unexpected situation occurs and causes the system current value greater than the upper limited current threshold value, step S28 will be executed.

At step S28, all the electrically-controlled switch units are turned off, so that charging power is stopped from being provided to the charging zones. Thereafter, step S29 is executed.

At step S29, the whole zone charging time started to be counted at step S26, is compared with the predetermined whole zone charging time. If the whole zone charging time is greater than the predetermined whole zone charging time, step S30 is executed. On the other hand, if the whole zone charging time is less than the predetermined whole zone charging time, step S32 is executed.

At step S30, a timer is counted down based on the predetermined subzone charging time. Meanwhile, the corresponding electrically-controlled switch unit is turned on, so that charging power can be provided to the corresponding charging zone. The charging zone number variable has been reset as step S24 is finished. Accordingly, at step S30, operation will be performed from the first electrically-controlled switch unit.

Step S30 will be finished only if the following two conditions are reached. For the first condition, the predetermined subzone charging time has been counted down to zero. For the second condition, the measured subzone current value is smaller than the lower limited current threshold value, and the lower limited current charging time is equal to the predetermined lower limited current charging time. If anyone of the above two conditions is reached, step S31 will be executed.

At step S31, it is determined whether the charging zone number, for which the subzone current has been recorded, is equal to the predetermined charging zone number. If the charging zone number, for which the subzone current has been recorded, is not equal to the predetermined charging zone number, step S30 will be executed again. The above steps S30 and S31 are repeated until the charging zone number, for which the subzone current has been recorded, equals the predetermined charging zone number. Meanwhile, the charging zone number variable is reset, and step S23 is then be executed.

At step S29 as the above, if the whole zone charging time is smaller than the predetermined whole zone charging time, step S32 will be executed.

At step S32, a timer is counted down based on the predetermined subzone charging time. Meanwhile, the corresponding electrically-controlled switch unit is turned on, so that the charging power can be provided to the corresponding charging zone. The charging zone number variable has been reset while step S24 is finished. Accordingly, at step S32, operation will be performed from the first electrically-controlled switch unit. Step S33 will be executed while the predetermined subzone charging time is counted down to zero.

At step S33, it is determined whether subzone current corresponding to each charging zone has been recorded. If the determined result shows that not all subzone currents have been recorded, step S32 is executed again. The above steps S32 and S33 are repeated until subzone currents of all charging zones have been recorded. Meanwhile, the charging zone number variable is reset, and step S23 is then be executed.

Figure 4:
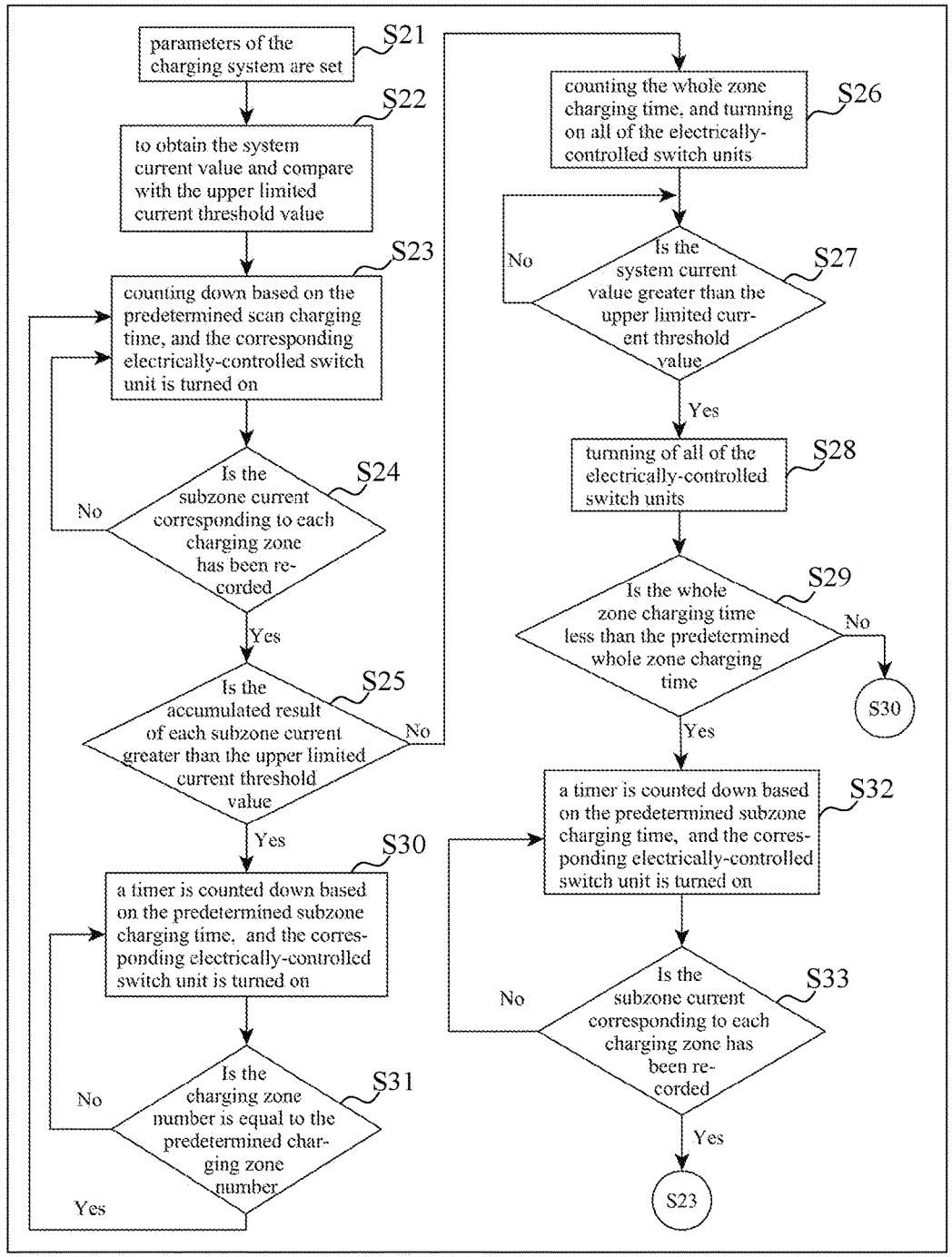
FIG. 4 is another flow chart showing the power charging management method according to an embodiment of the present invention.

In the following paragraphs, two examples are provided for describing the power charging management method for the charging control system by reference to FIG. 4 and steps S21 to S33 as the above.

For the power charging management method of the first embodiment of the present invention, parameters of the charging system are set as the following: the predetermined scan charging time is set as 10 sec, the predetermined charging zone number is set as 3, the predetermined subzone charging time is set as 20 minutes, the predetermined lower limited current charging time is set as 3 minutes, the predetermined whole zone charging time is set as 20 minutes, the upper limited current threshold value is set as 10A, and the lower limited current threshold value is set as 1A.

After execution of the system scan procedure at steps S23 to S25, required current values for each charging zone are shown in table T1:

TABLE T1

| charging zone | current (A) |
|---|---|
| The first charging zone | 7 |
| The second charging zone | 3 |
| The third charging zone | 7 |

From Table T1, sum of subzone currents of each charging zone is represented as: current of the first charging zone+current of the second charging zone+current of the third charging zone=17A, which is greater than the upper limited current threshold value (10A). Accordingly, the first subzone charging procedure at steps S30 to S31 will be executed. In this procedure, the first electrically-controlled switch unit of the first charging zone will be turned on for 20 minutes and then be turned off. Likewise, the second electrically-controlled switch unit of the second charging zone will be turned on for 20 minutes and then be turned off. In the same manner, the third electrically-controlled switch unit of the third charging zone will be turned on for 20 minutes and then be turned off Thereafter, steps S23 to S25 are executed again.

After further execution of the system scan procedures at steps S23 to S25, required current values for each charging zone are shown in table T2:

TABLE T2

| charging zone | current (A) |
|---|---|
| The first charging zone | 5.5 |
| The second charging zone | 0.5 |
| The third charging zone | 5.5 |

From Table T2, sum of subzone currents of each charging zone is represented as: current of the first charging zone+current of the second charging zone+current of the third charging zone =11.5A, which is still greater than the upper limited current threshold value (10A). Accordingly, the above first subzone charging procedure at steps S30 to S31 will be repeated. In this procedure, the first electrically-controlled switch unit of the first charging zone will be turned on for 20 minutes and then be turned off. Similarly, the second electrically-controlled switch unit of the second charging zone will be turned on for 3 minutes and then be turned off. In addition, the third electrically-controlled switch unit of the third charging zone will be turned on for 20 minutes and then be turned off Thereafter, steps S23 to S25 are executed again.

After further execution of the system scan procedures at steps S23 to S25, required current values for each charging zone are shown in table T3:

TABLE T3

| charging zone | current (A) |
|---|---|
| The first charging zone | 2 |
| The second charging zone | 0.5 |
| The third charging zone | 2 |

From Table T3, sum of subzone currents of each charging zone is represented as: current of the first charging zone+current of the second charging zone+current of the third charging zone=4.5A, which is smaller than the upper limited current threshold value (10A). Accordingly, the whole zone charging procedure at steps S26 to S27 will be executed. In the whole zone charging procedure, all of the first, the second and the third electrically-controlled switch units, which belong to the first, the second and the third charging zones respectively, are turned on.

About 25 minutes later for which the aforesaid whole zone charging procedure has been executed, a number of electronic devices are unexpectedly inserted into the charging control system. Such unexpected insertion may lead the system current value to be greater than the upper limited current threshold value. Herein, the protecting procedure at steps S28 to S29 will be executed. That is, all of the first, the second and the third electrically-controlled switch units, which belong to the first, the second and the third charging zones respectively, are turned off. The whole zone charging procedure has been executed for 25 minutes, and the whole zone charging time is therefore greater than the predetermined whole zone charging time. Accordingly, the first subzone charging procedure at steps S30 to S31 will be executed. In the first subzone charging procedure, the first electrically-controlled switch unit of the first charging zone will be turned on for 20 minutes and then be turned off. Similarly, the second electrically-controlled switch unit of the second charging zone will be turned on for 3 minutes and then be turned off. In addition, the third electrically-controlled switch unit of the third charging zone will be turned on for 20 minutes and then be turned off Thereafter, steps S23 to S25 are executed again.

For the power charging management method of the second embodiment of the present invention, parameters of the charging system are set as the following: the predetermined scan charging time is set as 10 sec, the predetermined charging zone number is set as 3, the predetermined subzone charging time is set as 20 minutes, the predetermined lower limited current charging time is set as 3 minutes, the predetermined whole zone charging time is set as 20 minutes, the upper limited current threshold value is set as 10A, and the lower limited current threshold value is set as 1A.

After execution of the system scan procedures at steps S23 to S25, required current value for each charging zone are shown in table T4:

TABLE T4

| charging zone | current (A) |
|---|---|
| The first charging zone | 2 |
| The second charging zone | 0.5 |
| The third charging zone | 2 |

From Table T4, sum of subzone currents of each charging zone is represented as: current of the first charging zone+current of the second charging zone+current of the third charging zone =4.5A, which is smaller than the upper limited current threshold value (10A). Accordingly, the whole zone charging procedure at steps S26 to S27 will be executed. In the whole zone charging procedure, all of the first, the second and the third electrically-controlled switch units, which belong to the first, the second and the third charging zones respectively, are turned on.

About 5 minutes later for which the above whole zone charging procedure has been executed, a rising of the system current value is detected. Such a rising causes the system current value to be greater than the upper limited current threshold value. Herein, the protecting procedure at steps S28 to S29 will be executed. That is, all of the first, the second and the third electrically-controlled switch units, which belong to the first, the second and the third charging zones respectively, are turned off. The whole zone charging procedure has been executed for merely 5 minutes, and the whole zone charging time is therefore smaller than the predetermined whole zone charging time. Accordingly, the second subzone charging procedure at steps S32 to S33 will be executed. In the second subzone charging procedure, the first electrically-controlled switch unit of the first charging zone will be turned on for 20 minutes and then be turned off. Likewise, the second electrically-controlled switch unit of the second charging zone will be turned on for 20 minutes and then be turned off. In the same manner, the third electrically-controlled switch unit of the third charging zone will be turned on for 20 minutes and then be turned off Thereafter, steps S23 to S25 are executed again.

Figure 5:
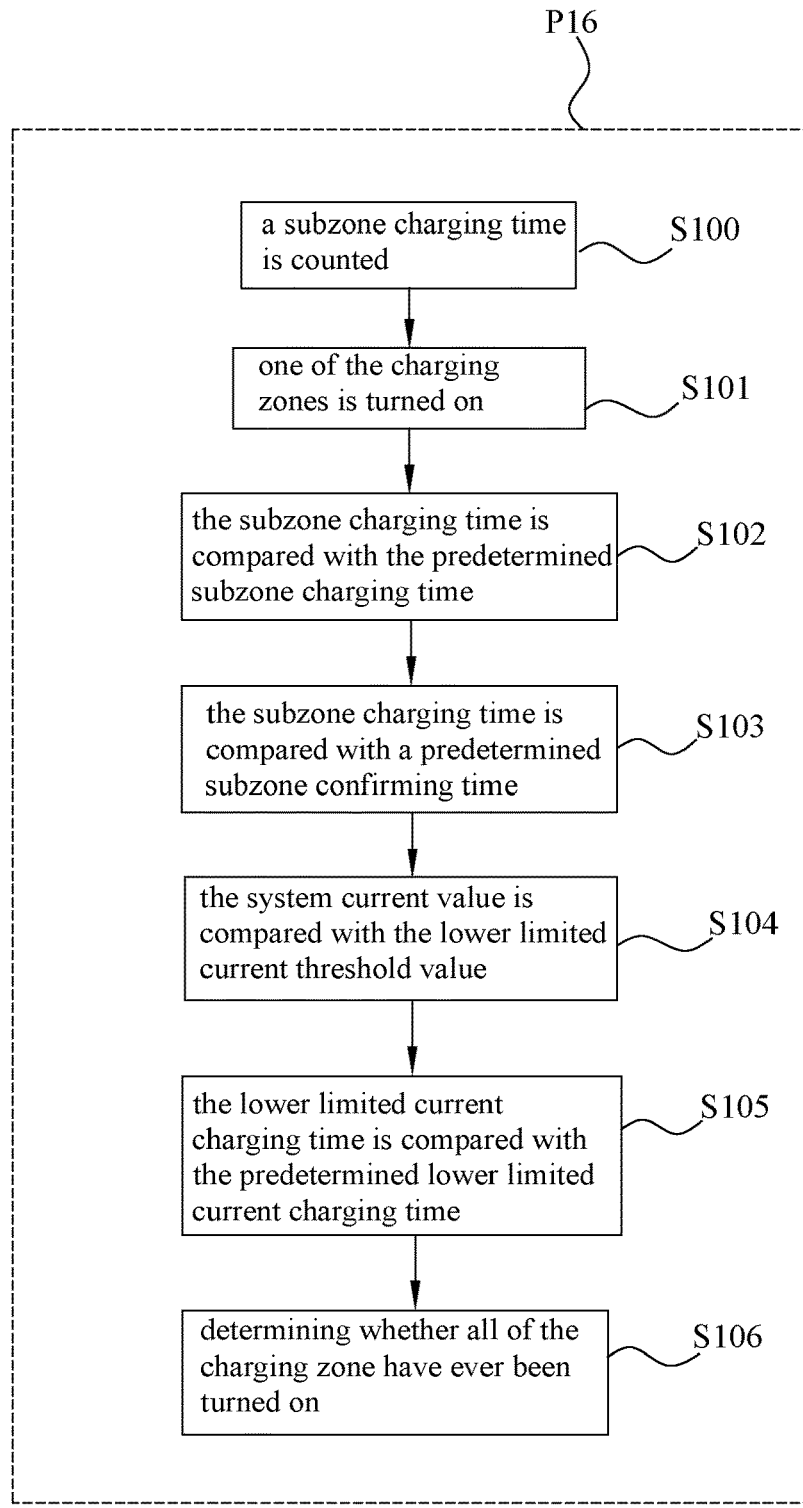
FIG. 5 is a flow chart showing another first subzone charging procedure of the power charging management method according to an embodiment of the present invention.

Additional, in other embodiment, the first subzone charging procedure P06 may be replaced by a first subzone charging procedure P16. Referring FIG. 5, the first subzone charging procedure P16 includes steps S100, S101, S102, S103, S104, S105 and S106.

At step S100, a subzone charging time is counted. Herein, counting of the subzone charging time is started while the first subzone charging procedure P16 is entered, and the counted subzone charging time will be recorded. At step S101, one of the charging zones is turned on, so that the charging power AC can be provided to the turned on charging zone. At step S102, the subzone charging time is compared with the predetermined subzone charging time. The step S103 is executed when the subzone charging time is less than the predetermined subzone charging time. The step S104 is excuted when the subzone charging time is equal to the predetermined subzone charging time.

At step S103, the subzone charging time is compared with a predetermined subzone confirming time. The step S102 is executed when the subzone charging time is less than the predetermined subzone confirming time. The step S104 is executed when the subzone charging time is equal to or greater than the predetermined subzone confirming time.

At step S104, the system current value is compared with the lower limited current threshold value and a lower limited current charging time is counted. At step S105, the lower limited current charging time is compared with the predetermined lower limited current charging time. Herein, if the system current value is smaller than the lower limited current threshold value and the lower limited current charging time is equal to or greater than the predetermined lower limited current charging time, power level of the charging zone will be determined as full. If the subzone charging time is equal to the predetermined subzone charging time or if power level of the charging zone is determined as full, step S106 is executed. At step S106, it is determined whether all of the first charging zone A to the third charging zone C have ever been turned on. If the determined result is negative, another one of the charging zones is turned on. On the other hand, if the determined result is confirmative, the system scan procedure P03 described above is executed.

In the following paragraphs, an example is provided for describing the first subzone charging procedure P16. In this embodiment, the power charging management method for the charging control system is similar to the above embodiment expect the first subzone charging procedure P16.

For the power charging management method of the embodiment of the present invention, parameters of the charging system are set as the following: the predetermined scan charging time is set as 10 sec, the predetermined charging zone number is set as 3, the predetermined subzone charging time is set as 20 minutes, the predetermined subzone confirming time is set as 5 minutes, the predetermined lower limited current charging time is set as 30 sec, the predetermined whole zone charging time is set as 20 minutes, the upper limited current threshold value is set as 10A, and the lower limited current threshold value is set as 1A.

Before preparing to enter the first subzone charging procedure P16, required current values for each charging zone are shown in table T1:

TABLE T5

| charging zone | current (A) |
|---|---|
| The first charging zone | 2 |
| The second charging zone | 4 |
| The third charging zone | 7 |

From Table T5, sum of subzone currents of each charging zone is represented as: current of the first charging zone+current of the second charging zone+current of the third charging zone=13A, which is greater than the upper limited current threshold value (10A). Accordingly, the first subzone charging procedure at steps S101 to S106 of the first subzone charging procedure P16 will be executed. Additionally, in the embodiment, current of the first charging zone is 0.9A after charging for 3 minutes, current of the second charging zone is 1.5A after charging for 5 minutes and 0.9A after charging for 9 minutes, current of the third charging zone is 5.5A after charging for 5 minutes and 2A after charging for 20 minutes.

The system current is measured to obtain current of the first charging zone is 0.8A after the first switch unit of the first charging zone is turned on for 5 minutes, then the first switch unit is turned off when the current of the first charging zone is maintained lower than 1A for 30 seconds, and then, the second switch unit of the second charging zone is turned on. It is to be noted, the first switch unit would not be turned off even though the current of the first charging zone is 0.9A, which is lower than 1A, after charging for 3 minutes.

The system current is measured to obtain current of the second charging zone is 1.5A after the second switch unit of the second charging zone is turned on for 3 minutes, then the system current is continuously measured. The system current is measured to obtain current of the second charging zone is 0.9A after the second switch unit of the second charging zone is turned on for 9 minutes, then the second switch unit is turned off when the current of the second charging zone is maintained lower than 1A for 30 seconds, and then, the third switch unit of the third charging zone is turned on.

The system current is measured to obtain current of the third charging zone is 5.5A after the third switch unit of the third charging zone is turned on for 5 minutes, then the system current is continuously measured, and then, the third switch unit is turned off when the third switch unit is turned on for 20 minutes (the subzone charging time is equal to the predetermined subzone charging time), and then, the system scan procedure mentioned above is executed.

In summary, in the present invention, the charging control system and the power charging management method thereof utilizes the system scan procedure, the whole zone charging procedure, the first subzone charging procedure, the second subzone charging procedure and the protecting procedure during the charging process so as to suit various charging conditions. Furthermore, by the control system and management method of the present invention, the electrically-controlled switch units can be prevented from being frequently turned on that may cause decreased lifetime for components. Moreover, when overloading of the charging control system occurs, charging power can be still provided to all electronic devices by means of subzone charging, so stat power distribution system and charging control system may be protected. In addition, efficiency and utilization for the charging control system may be enhanced, and an effective power charging management method may be thereby achieved.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A power charging management method for a charging control system including a control unit and a plurality of charging zones, the control unit controlling the charging zones to turn on or turn off so as to selectively allow a charging power to be provided to the charging zones, the method comprising:
   a system scan procedure, comprising:
      measuring a subzone current value for each of the charging zones sequentially and summing all of the measured subzone current values to obtain a system current value; and
      comparing the system current value with a upper limited current threshold value;
   a whole zone charging procedure, which is executed if, in the system scan procedure, the system current value is identified as smaller than the upper limited current threshold value, comprising:

turning on all of the charging zones so as to provide the charging power to all of the charging zones;
measuring the system current value;
comparing the system current value with the upper limited current threshold value; and
measuring the system current value if the system current value is smaller than the upper limited current threshold value; and
a first subzone charging procedure, which is executed if, in the system scan procedure, the system current value is identified as greater than the upper limited current threshold value, comprising:
turning on one of the charging zones so as to provide the charging power to the turned-on charging zone;
comparing a subzone charging time with a predetermined subzone charging time;
determining whether a power level of the turned-on charging zone is full;
determining whether all of the charging zones have ever been turned on if the subzone charging time is equal to the predetermined subzone charging time or if the power level of the turned-on charging zone is full;
turning on another one of the charging zones if not all the charging zones have ever been turned on; and
executing the system scan procedure if all of the charging zones have ever been turned on.

2. The power charging management method of claim 1 further comprises a protecting procedure which is executed if, in the whole zone charging procedure, the system current value is identified as greater than the upper limited current threshold value, the protecting procedure comprising:
turning off all of the charging zones so as to prevent the charging power from being provided to all of the charging zones; and
comparing a whole zone charging time with a predetermined whole zone charging time.

3. The power charging management method of claim 2, wherein the first subzone charging procedure is further executed if, in the protecting procedure, the whole zone charging time is identified as greater than the predetermined whole zone charging time.

4. The power charging management method of claim 2 further comprises a second subzone charging procedure which is executed if, in the protecting procedure, the whole zone charging time is identified as smaller than the predetermined whole zone charging time, the second subzone charging procedure comprising:
turning on one of the charging zones sequentially so as to provide the charging power to the turned-on charging zones;
determining whether all of the charging zones have ever been turned on; and
executing the system scan procedure if all of the charging zones have ever been turned on.

5. The power charging management method of claim 4, wherein the second subzone charging procedure further comprising:
comparing the subzone charging time with the predetermined subzone charging time.

6. The power charging management method of claim 5, wherein the step of determining whether all of the charging zones have ever been turned on is executed if the subzone charging time is identified as equal to the predetermined subzone charging time.

7. The power charging management method of claim 2 further comprises an initial measuring procedure, the initial measuring procedure comprising:
obtaining the system current value;
executing the protecting procedure if the system current value is greater than the upper limited current threshold value; and
executing the system scan procedure or the step of comparing the whole zone charging time with the predetermined whole zone charging time in the protecting procedure, if the system current value is smaller than the upper limited current threshold value.

8. The power charging management method of claim 1, wherein, in the system scan procedure, the step of measuring the subzone current value for each of the charging zones sequentially and summing all of the measured subzone current values to obtain the system current value, further comprising:
turning on one of the charging zones so as to provide the charging power to the turned-on charging zone;
comparing a scan charging time with a predetermined scan charging time;
recording a measured subzone current value of the turned-on charging zone, if the scan charging time is identified as equal to the predetermined scan charging time; and
determining whether all of the charging zones have ever been turned on.

9. The power charging management method of claim wherein the whole zone charging procedure further comprising:
counting the whole zone charging time.

10. The power charging management method of claim 1, wherein the first subzone charging procedure further comprising:
counting a lower limited current charging time.

11. The power charging management method of claim 10, wherein, in the first subzone charging procedure, the step of determining whether a power level of the turned-on charging zone is full, comprising:
comparing the system current value with a lower limited current threshold value;
comparing the lower limited current charging time with a predetermined lower limited current charging time; and
determining the power level of the turned-on charging zone as full if the system current value is smaller than a lower limited current threshold value and, if the lower limited current charging time is equal to the predetermined lower limited current charging time.

12. The power charging management method of claim 10, wherein, in the first subzone charging procedure, the step of determining whether a power level of the turned-on charging zone is full, comprising:
comparing the system current value with a lower limited current threshold value;
comparing the lower limited current charging time with a predetermined lower limited current charging time;
comparing the subzone charging time with a predetermined subzone confirming time; and
determining the power level of the turned-on charging zone as full if the system current value is smaller than a lower limited current threshold value and, if the lower limited current charging time is equal to the predetermined lower limited current charging time.

13. A charging control system, comprising:
a power converting unit, including a input terminal and a output terminal, to receive a charging power through the input terminal and output a direct-current power through the output terminal;

a control unit, being electrically coupled to the output terminal of the power converting unit, to receive the direct-current power and output a switch control signal;

a plurality of driving units, each being electrically coupled to the control unit respectively, to receive the switch control signal;

a plurality of electrically-controlled switch units, each being electrically coupled to a corresponding one of the driving units, wherein the corresponding one of the driving units controls operation of the respective one of the electrically-controlled switch units in response to the switch control signal; and a current sensing unit, being electrically coupled between the electrically-controlled switch units and the charging power, to detect a system current value and transmit the system current value to the control unit;

wherein if the system current value is smaller than a upper limited current threshold value, the control unit is configured to selectively execute one of a scan charging procedure, a subzone charging procedure and a whole zone charging procedure and output the switch control signal to control operation of the electrically-controlled switch units.

14. The charging control system of claim 13, wherein the subzone charging procedure comprises a first subzone charging procedure and a second subzone charging procedure.

15. The charging control system of claim 13, wherein each one of the electrically-controlled switch units is electrically coupled to at least one power output terminal, the electrically-controlled switch units and the power output terminals are divided into a plurality of charging zones.

* * * * *